United States Patent [19]

Breed

[11] 4,040,326
[45] Aug. 9, 1977

[54] FASTENER ASSEMBLY

[76] Inventor: Arthur R. Breed, 12900 Lake Ave., Lakewood, Ohio 44107

[21] Appl. No.: 554,397

[22] Filed: Mar. 3, 1975

[51] Int. Cl.$^2$ .................... F16B 37/12; F16B 39/28
[52] U.S. Cl. .............................. 85/32 CS; 151/14 CS
[58] Field of Search ............... 85/32 CS, 64, 46, 1 R; 151/14 CS

[56] References Cited

U.S. PATENT DOCUMENTS

| | | | |
|---|---|---|---|
| 782,349 | 2/1905 | Marshall | 85/32 CS X |
| 2,346,051 | 4/1944 | Seamark | 85/32 CS X |
| 2,401,912 | 6/1946 | Cram | 85/32 CS |
| 2,672,070 | 3/1954 | Forster | 85/32 CS |
| 2,775,992 | 1/1957 | Smith | 151/14 CS |
| 3,316,795 | 5/1967 | Tann | 151/14 CS X |
| 3,515,027 | 6/1970 | Textrom | 85/32 CS |

FOREIGN PATENT DOCUMENTS

| | | | |
|---|---|---|---|
| 20,789 | 3/1905 | Austria | 151/14 CS |
| 353,313 | 1/1971 | Japan | 85/32 CS |

*Primary Examiner*—Ramon S. Britts

[57] ABSTRACT

An improved fastener assembly includes helical internal and external thread convolutions. A generally helical insert having a plurality of turns is disposed between the internal and external thread convolutions. This insert is resiliently twisted or flexed from a first condition to a fully deflected condition under the influence of torsion forces applied to the insert by the internal and external thread convolutions. In one embodiment of the invention, the insert has four side surfaces. When this insert is in the first condition, one pair of side surfaces is disposed in abutting engagement with the leading flanks of the internal and external thread convolutions. At this time the other side surfaces of the insert are spaced apart from the trailing flank surfaces of the thread convolutions. As used herein, the leading flank surfaces of the thread convolutions are the flank surfaces which, when the thread is about to be assembled with a mating thread, face the mating thread. Upon twisting of the insert to a deflected condition, the side surfaces of the insert move away from the leading flanks of the thread convolutions and move into abutting engagement with the trailing flanks of the thread convolutions. Under conditions in which it is desired to pretension the internal thread convolution, the internal thread convolution is formed with a smaller pitch than the external thread convolution. In another embodiment of the invention, the insert is provided with an arcuate surface which engages one of the thread convolutions and a pair of side surfaces to engage the flanks of the other thread convolution. The internal and external thread convolutions may have different pitches to provide a locking action between the insert and the thread convolutions.

7 Claims, 6 Drawing Figures

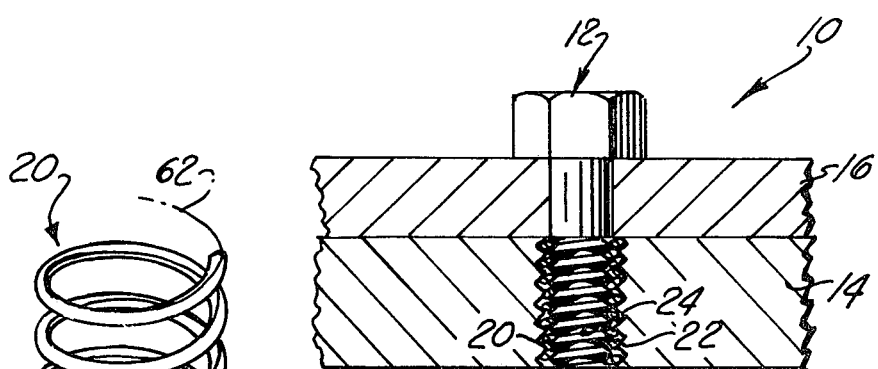
FIG. 1
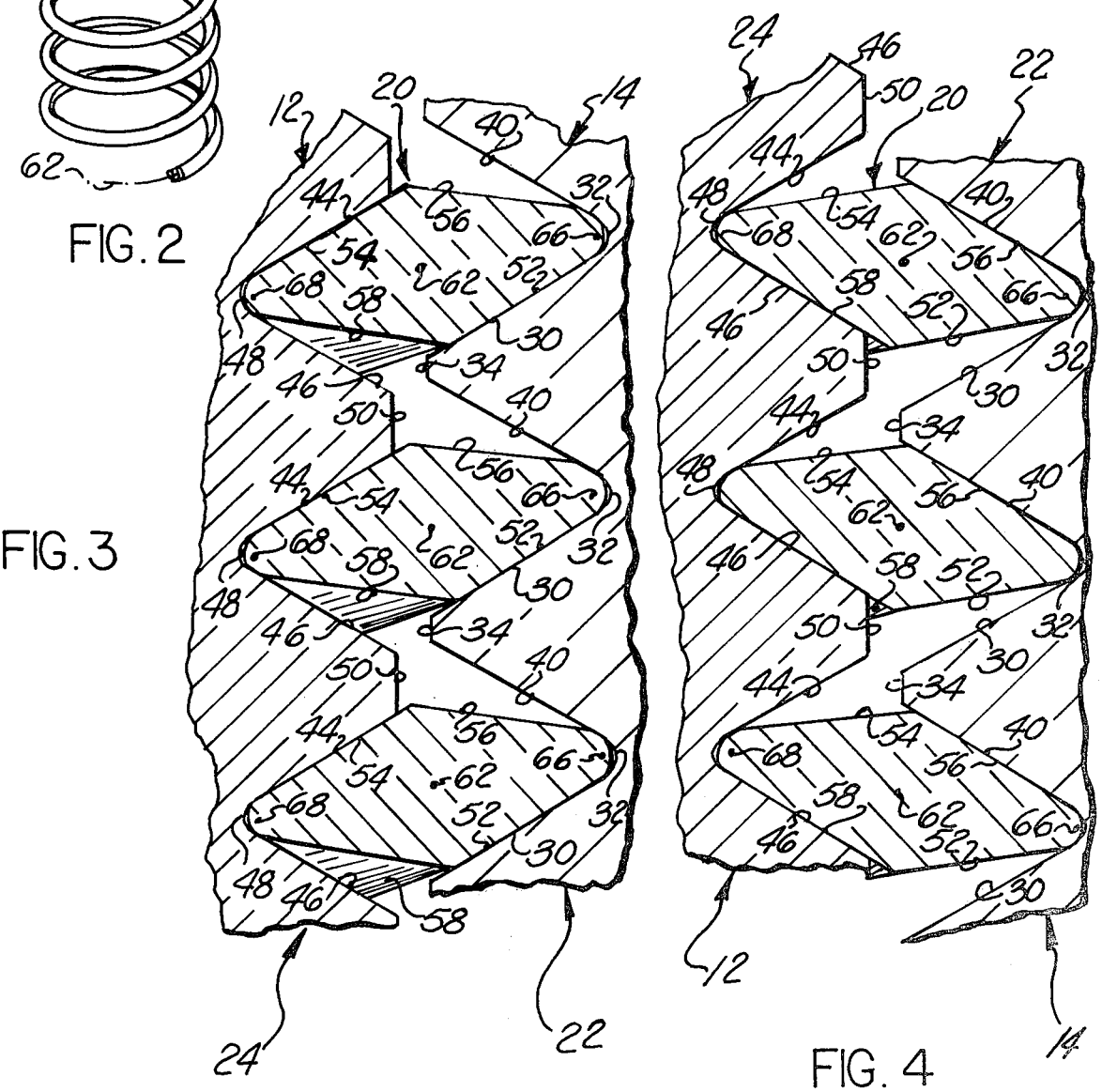
FIG. 2
FIG. 3
FIG. 4

FASTENER ASSEMBLY

BACKGROUND OF THE INVENTION

This invention relates generally to a fastener assembly and more specifically to a fastener assembly which includes an insert which is effective to transmit forces between internal and external thread convolutions.

Helical inserts have previously been utilized in association with externally threaded members in many different fastener assemblies. Some of these known fastener assemblies are disclosed in U.S. Pat. No. 2,152,681; 3,444,915; and 3,515,027. Although the interaction between the externally threaded member and the helical insert of these known fastener assemblies has been more or less satisfactory, it is believed that the interaction between the insert and the threaded member has not been such as to optimize the characteristics of the known fastener assembly.

When short bolts are utilized to interconnect thin plates, difficulty has been encountered due to the inability of the short bolts to elastically deform under the influence of axial loads. Therefore, when a relatively large axial load is applied to the short bolt it deforms plastically with a resulting loosening of the connection upon a reduction in the axial load. In addition, difficulty has been encountered with connections used in environments where there is a substantial amount of creep, for example in connections used in association with gaskets or zinc alloy members.

SUMMARY OF THE INVENTION

The present invention provides an improved fastener assembly in which a helical insert is utilized in association with internal and external thread convolutions. Upon the application of a load to the helical insert, it is resiliently twisted about a helical axis extending through each of the turns of the insert. When the improved fastener assembly is to be utilized in environments where a fastener assembly is subjected to varying loads, the helical insert may be utilized to maximize the elastic deformation capacity of the fastener assembly. As the load applied to the fastener assembly increases, the helical insert is resiliently twisted. Upon a subsequent decrease in the load applied to the fastener assembly, the helical insert untwists to maintain a tight connection. When the improved fastener assembly is utilized in environments where there is substantial amount of creep and it is desired to maintain a tight connection, the helical insert is resiliently twisted as the fastener assembly is initially tightened to thereby store potential energy in the insert. Upon the occurrence of creep, the insert untwists to maintain a tight connection.

A helical insert constructed in accordance with the present invention has a pair of side surfaces which are associated with one of a pair of thread convolutions. Assuming that the side surfaces of the insert are associated with an external thread convolution, as the axial load applied to the fastener assembly increases, the insert is resiliently twisted. As the insert twists, one of the side surfaces of the insert moves out of abutting engagement with one flank of the external thread convolution and the other side surface of the insert moves into abutting engagement with the other flank of the external thread convolution. As this occurs, forces are transmitted between the roots of the internal and external thread convolutions. Once the insert has been twisted to a fully deflected position, the insert is effective to transmit axial loads between flanks of the internaal and external thread convolutions. It should be noted that the resilient twisting of the insert can occur under the influence of either the initial tightening forces applied to the fastener assembly or under the influence of increasing load forces applied after the intial tightening of the fastener assembly.

Although the helical insert could, if desired, be utilized with internal and external thread convolutions having the same pitch, in one specific preferred embodiment of the invention, the internally threaded member has a different number of turns per unit of axial length or pitch than does the externally threaded member. This results in the application of forces to the insert to twist the insert and provide a locking action between the insert and the flanks of the internal and external thread convolutions as they are interconnected. The difference in pitch between the internal and external thread convolutions can be obtained by providing the internal thread convolution with a greater or lesser pitch than the external thread convolution. Conversely, the difference in pitch can be obtained by providing the external thread convolution with a greater or lesser pitch than the internal thread convolution.

Accordingly, it is an object of this invention to provide a new and improved fastener assembly in which a helical insert is twisted under the influence of torsion forces applied to the insert by internal and external thread convolutions.

Another object of this invention is to provide a new and improved assembly in which a helical insert is twisted from a first condition to a deflected condition under the influence of torsion forces applied to the insert by internal and external thread convolutions and wherein a leading flank surface of a thread convolution is disposed in abutting engagement with the insert and a trailing flank surface of the thread convolution is spaced apart from the insert when the insert is in the first condition and wherein the trailing flank surface of the thread convolution abuts the insert and the leading flank surface of the thread convolution is spaced apart from the insert when it is in the fully deflected condition.

Another object of this invention is to provide a new and improved fastener assembly in which an insert is disposed in abutting engagement with internal and external thread convolutions and wherein the internal thread convolution has a different number of turns per unit of axial length than the external thread convolution to thereby promote a locking action between the insert and the thread convolutions.

BRIEF DESCRIPTION OF THE DRAWINGS

The foregoing and other objects and features of the present invention will become more apparent upon a consideration of the following description taken in connection with the following drawings wherein:

FIG. 1 is a sectional view of a fastener assembly constructed in accordance with the present invention;

FIG. 2 is an enlarged illustration of a helical insert utilized in the fastener assembly of FIG. 1;

FIG. 3 is a greatly enlarged fragmentary sectional view of a portion of the fastener assembly of FIG. 1 and illustrating the relationship between internal and external thread convolutions and a plurality of turns of the helical insert when the fastener assembly is in an unloaded condition;

FIG. 4 is an enlarged sectional view, generally similar to FIG. 3, illustrating the relationship between the internal and external thread convolutions and the helical insert when the fastener assembly is in a loaded condition;

DESCRIPTION OF SPECIFIC PREFERRED EMBODIMENTS OF THE INVENTION

Figure 5:
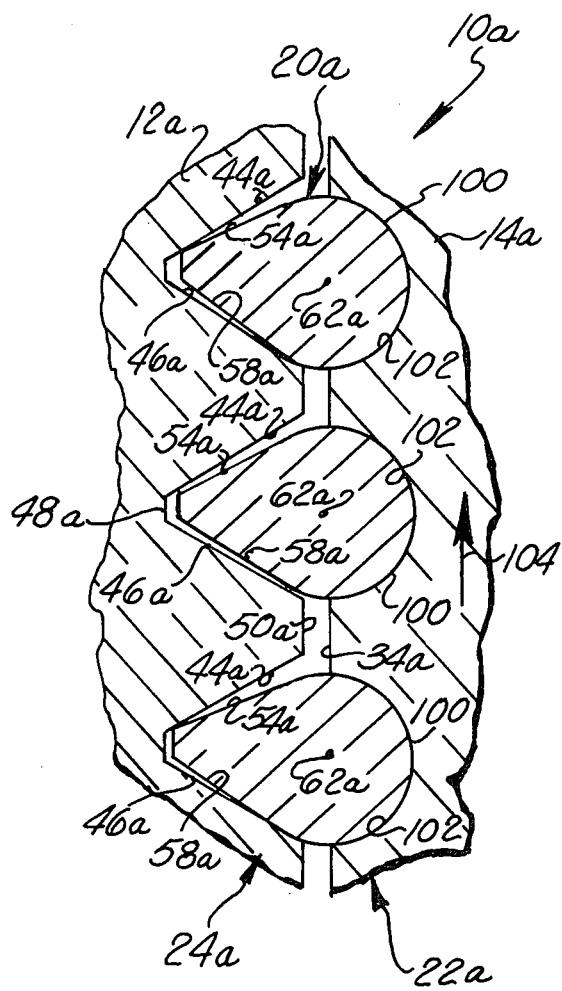
FIG. 5 is an enlarged sectional view of a second embodiment of the invention in which the helical insert has an arcuate surface, the insert being shown in an unloaded condition in association with internal and external thread convolutions.

A fastener assembly 10 constructed in accordance with the present invention is illustrated in FIG. 1 and includes an externally threaded member or bolt 12 and an internally threaded member or plate 14. Although the internally threaded member takes the form of a plate 14 and is utilized to clamp a second plate 16 against the head of the bolt 12 in the illustrated embodiment of the invention, it should be understood that the internally threaded member 14 could be a nut or other member. Also, it should be understood that the externally threaded member need not be a bolt but could be any member having external thread convolutions.

In accordance with a feature of the present invention, a helical insert 20 (see FIG. 2) is disposed between an internal thread convolution 22 on the plate 14 and an external thread convolution 24 on the bolt 12. As is perhaps best seen in FIG. 3, the internal and external thread convolutions 22 and 24 have the configuration of Unified National Form Screw Threads. However, the internal and external thread convolutions 22 and 24 could have other configurations if desired.

The internal thread convolution 22 has a helical leading flank surface 30 which extends between the helical root 32 and crest 34 of the internal thread convolution. Similarly, the internal thread convolution 22 has a helical trailing flank surface 40 which also extends between the root 32 and crest 34 of the internal thread convolution 22. In the specific preferred embodiment of the invention illustrated in FIG. 3 of the drawings, the leading and trailing flanks 30 and 40 of the internal thread convolution 22 have equal flank angles of 30°.

Similarly, the external thread convolution 24 includes helical leading and trailing flank surfaces 44 and 46 which extends between roots and crests 48 and 50 of the internal thread 24. The leading and trailing flanks 44 and 46 of the external thread convolution 24 flank angles of 30°. It should be noted that the leading flanks of the internal and external thread convolutions 22 and 24 are the flanks which, when the thread is about to be assembled with a mating thread, face the mating thread. The trailing flanks are considered to be the flanks which are opposite from the leading flanks.

When the fastener assembly 10 is in the unstressed or unloaded condition shown in FIG. 3, a pair of parallel helical side surfaces 52 and 54 on opposite sides of the insert 20 are disposed in flat planar abutting engagement with the leading flank surfaces 30 and 44 of the internal and external thread convolutions 22 and 24. At this time, a pair of parallel helical side surfaces 56 and 58 on the insert 20 are spaced apart from the trailing flank surfaces 40 and 46 of the internally and externally threaded members 22 and 24.

Upon the application of an axial load to the fastener assembly 10, the internal and external thread convolutions 22 and 24 shift relative to each other from the first or unloaded position of FIG. 3 to the second or loaded position of FIG. 4. As this occurs, the helical insert 20 is twisted about a helical axis 62 which extends through each turn on the insert. As the helical insert 20 is twisted from the first position of FIG. 3 to the fully deflected position of FIG. 4, the side surfaces 52 and 54 of the insert move out of engagement with the leading flanks 30 and 44 of the internal and external thread convolutions 22 and 24. Thereafter the helical side surfaces 56 and 58 move into flat abutting engagement with the trailing flanks 40 and 46 of the internal and external thread convolutions 22 and 24 (see FIG. 4).

The torsion forces which cause the insert 20 to resiliently twist about the axis 62 are applied to the insert at the roots 32 and 48 of the internal and external thread convolutions 22 and 24. Thus upon axial loading of the fastener assembly 10, a downwardly directed force is applied to the arcuate corner portion 66 of the insert 20 at the root 32 of the internal thread convolution 22. Simultaneously therewith, an upwardly directed force is applied to the corner portion 68 of the insert 20 at the root 48 of the external thread convolution 24. These two oppositely directed forces result in a resilient twisting of the insert in a generally clockwise direction about the axis 62 from the position shown in FIG. 3 to the fully deflected position shown in FIG. 4.

As the insert 20 is resiliently twisted, all of the load applied to the fastener assembly 10 is transmitted between the roots 32 and 48 of the internal and external thread convolutions 22 and 24 by the insert 20. Until the side surfaces 56 and 58 of the insert 20 are moved into engagement with the trailing flank surfaces 40 and 46 of the thread convolutions 22 and 24, the insert is ineffective to apply forces against the flanks of the thread convolutions. Of course, once the insert 20 has been resiliently twisted to the fully deflected position of FIG. 4, the application of a further load to the fastener assembly 10 results in the transmittal of forces from the side surfaces 56 and 58 of the insert 20 to the trailing flank surfaces 40 and 46 of the internal and external thread convolutions 22 and 24. Since the initial portion of the load on the fastener assembly 10 was transmitted between the roots of the internal and external thread convolutions and the insert 20 and was not applied directly to the flanks of the insert, the fastener assembly 10 can withstand a greater axial force without stripping or otherwise failing than it could if the internal and external thread convolutions 22 and 24 were in mating threaded engagement.

To facilitate relative movement between the internal and external thread convolutions 22 and 24 resilient twisting of the helical insert 20, the crest diameter of the internal thread convolution 22 is greater than the crest diameter of the external thread convolution 24. Therefore, the crests 34 and 50 of the thread convolutions 22 and 24 to not interfere with each other as the fastener assembly changes from the unloaded condition of FIG. 3 to the loaded condition of FIG. 4.

When the axial load on the fastener assembly 10 is reduced, the fastener assembly moves from the loaded condition of FIG. 4 to the unloaded condition of FIG. 3. Thus upon an initial reduction in the loading on the fastener assembly 10, the force transmitted between the side surfaces 56 and 58 of the insert 20 and the trailing flanks 40 and 46 of the internal and external thread convolutions is reduced. Once the axial loading on the fastener assembly 10 has been sufficiently reduced, the natural resilience of the insert 20 causes it to twist in a counterclockwise direction (as viewed in FIG. 4) about the helical axis 62. As this occurs, the side surfaces 56 and 58 of the insert 20 move away from the trailing flank surfaces 40 and 46 and the side surfaces 52 and 54 on the insert move toward the leading flank surfaces 30 and 44. Of course, when the load on the fastener assembly 10 has been sufficiently reduced, the side surfaces 52 and 55 are again in abutting engagement with the leading flank surfaces 30 and 44 of the internal and external thread convolutions 22 and 24 (see FIG. 3).

It should be noted that the axial load forces which cause the insert 20 to be resiliently deflected from the first position of FIG. 3 to the fully deflected position of FIG. 4 can be applied to the fastener assembly 10 upon initial tightening of the fastener assembly or upon subsequent loading of the fastener assembly. For example, if a variable load tending to separate the plates 14 and 16 of FIG. 1 will be increased after the fastener assembly 10 has been initially tightened, the insert 20 should be relatively stiff so that the fastener assembly 10 can be initially tightened with the insert in the undeflected condition of FIG. 3. Upon the subsequent application of a relatively large load tending to separate the plates 14 and 16, the insert 20 is resiliently deflected to the position shown in FIG. 4 under the influence of the increasing load. Any further increase in the load applied to the fastener assembly 10 is transmitted to the internal and external thread convolutions 22 and 24 by the insert 20. Upon a subsequent reduction in the force tending to separate the plates 14 and 16, the insert 20 untwists from the condition shown in FIG. 4 to the condition shown in FIG. 3. In this manner, the helical insert 20 maximizes the elastic deformation capacity of the fastener assembly 10 so that a tight connection is maintained between the plates 14 and 16 after the load tending to separate the plates has been reduced.

The axial load causing the insert 20 to be deflected from the position shown in FIG. 3 to the position shown in FIG. 4 could be applied to the insert upon initial tightening of the fastener assembly 10. Thus, when the fastener assembly 10 is utilized in an environment where it is contemplated that there will be substantial amounts of creep, the bolt 12 would be tightened with a force sufficient to resiliently deflect the helical insert 20 to the condition shown in FIG. 4. This resilient deflection of the insert stores potential energy in the insert. Upon the subsequent occurrence of creep and a tendency for the connection between the plates 14 and 16 to loosen, the potential energy stored in the helical insert 20 causes relative movement between the internal and external thread convolutions 22 and 24 in such a manner as to maintain a tight connection. During this relative movement between the thread convolutions 22 and 24, the helical insert 20 moves from the deflected condition shown in FIG. 4 toward the undeflected condition shown in FIG. 3.

In forming the fastener assembly 10, the helical insert 20 is first turned or threaded into the internal thread convolution 22 in the plate member 14. The bolt 12 is then turned or threaded into the helical insert. Of course, this procedure could be reversed and the helical insert turned onto the bolt 12 and then subsequently threaded into the plate 14 with the bolt.

In the embodiment of the invention illustrated in FIGS. 3 and 4, the internal and external thread convolutions 22 and 24 have the same pitch or number of turns per inch of axial length. In accordance with a feature of the present invention, it is contemplated that the internal and external thread convolutions 22 and 24 and helical insert 20 will be utilized in an environment in which it is desired to have a locking action between the insert 20 and the internal and external thread convolutions 22 and 24 to prevent loosening of the connection. This locking action is obtained without axially loading the fastener assembly by forming the internal thread convolution 22 with a different number of turns per unit of axial length than the external thread convolution 24. For example, the internal thread convolution 22 is provided with more turns per unit of axial length than the external thread convolution, that is the internal thread convolution 22 has a smaller pitch than the external thread convolution 24. As the internal and external thread convolutions are interconnected, the various uniform turns of the helical insert 20 are twisted by the mismatched thread convolutions. This twisting of the insert causes a wedging-type locking action between the insert and the flanks of the internal and external thread convolutions. Of course this locking action could be obtained by forming the internal thread convolution with a smaller number of turns per unit of axial length than the external thread convolution. In either case, the forces resulting from the locking action resiliently deform the thread convolutions of the rotated insert so that the insert conforms to both internal thread convolutions at the roots 32 and 48.

It should be noted that in order to provide for relative movement between the internal and external thread convolutions 22 and 24 and a twisting of the helical insert 20, it is necessary for the included angle between the sides 52 and 56 of the helical insert 20 to be less than the included angle between the leading and trailing flank surfaces 30 and 40 of the external thread convolution 22. Similarly, it is necessary for the included angle between the side surfaces 54 and 58 of the helical insert 20 to be less than the included angle between the leading and trailing flank surfaces 44 and 46 of the external thread convolution 24. In the illustrated embodiment of the invention the included angles between the side surfaces of the insert 20 are both equal to approximately 40° while the included angles between the leading and trailing flank surfaces of the thread convolutions 22 and 24 is 60°. Although the resulting symmetrical shapes of the two thread convolutions 22 and 24 and insert 20 in a radial plane is believed to be advantageous for certain conditions, it is contemplated that the flank angles of the internal and external threads could be nonsymmetrical and that the included angles between adjacent sides of the insert would not necessarily be equal. For example, the flank angle of the leading flank 44 of the external thread convolution 24 could be 40° while the flank angle of the trailing flank 46 of the thread convolution was 30°.

Of course the external thread convolution 22 could have leading and trailing flank angles of the same size as the leading and trailing flank angles of the external thread convolution 24. However, it is also contemplated that the internal thread convolution 22 could have flank angles which are different from the flank angles of the external thread convolution. Assuming that the flank angles of the internal thread convolution 22 were different than the flank angles of the external thread convolution 24, the included angle between the side surfaces 54 and 58 would be different than the included angle between the side surfaces 52 and 56. Of course, the radial cross sectional configuration of the insert 20 would be different from the parallelogram type configuration illustrated in FIGS. 3 and 4. Although the helical insert 20 could be made from different materials, depending upon the materials from which the internal and external thread convolutions 22 and 24 are made; in one specific preferred embodiment of the invention the helical insert 20 was made of a relatively resilient spring metal while the internal and external thread convolutions were formed of steel.

In the embodiment of the invention illustrated in FIGS. 3 and 4, the internal and external thread convolutions 22 and 24 have a generally standard configuration. In the embodiment of the invention illustrated in FIGS. 5 and 6, the internal thread convolutions have a nonstandard configuration and the external thread convolutions have a generally standard configuration. The nonstandard internal thread convolutions have a generally arcuate cross sectional configuration to minimize stress concentrations in the internally threaded member. Of course, the internal thread convolutions could have the standard configuration and the external thread convolutions could have the nonstandard configuration. Since the elements of the embodiment of the invention illustrated in FIGS. 5 and 6 are generally similar to the elements of the embodiment of the invention illustrated in FIGS. 1–4, and since they cooperate in much the same manner, similar numerals will be be utilized to designate similar elements, the suffix letter *a* associated with the numerals designating elements of FIGS. 5 and 6 in order to avoid confusion.

Figure 6:
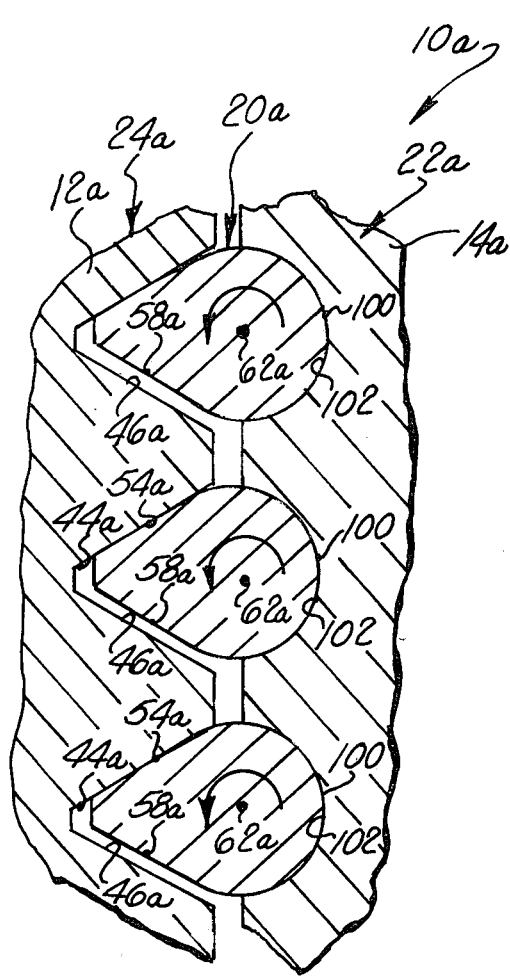
FIG. 6 is a sectional view illustrating the helical insert of FIG. 5 in a loaded condition.

The fastener assembly 10*a* FIG. 5 includes an internally threaded member 14*a* and an externally threaded member 12*a*. The internally threaded member 14*a* has a helical thread convolution 22*a* formed by a generally semicircular surface 100. A helical insert 20*a* is provided with a semicircular outer surface 102 which is disposed in abutting engagement with the semicircular bottom surface of the internal thread 22*a*. The standard external thread convolution 24*a*, like the thread convolution 24, is provided with leading and trailing flank surfaces 44*a* and 46*a*.

When the fastener assembly 10*a* is in the unloaded condition of FIG. 5, a side surface 54*a* is spaced apart from the flank surfaces 44*a* of the internal thread convolution 24*a*. The side surface 58*a* is in engagement with the flank surface 46*a*. Upon the application of an axial load to the externally threaded member 12*a* in the direction of the arrow 104, the insert 20*a* is rotated in a counterclockwise direction about a helical axis 62*a* extending through each of the various uniform turns of the helical insert 20*a*. This moves the helical side surface 54*a* into flat abutting engagement with the helical trailing flank surface 44*a* in the manner shown in FIG. 6. The continued application of axial loading forces to the fastener assembly 10 results in the transmission of loads between the helical side surface 54*a* of the insert 20*a* and the flank surfaces 44*a*. Of course, the arcuate surface 102 on the insert 20*a* is then effective to transmit forces to the trailing portion of the arcuate surface 100 of the external thread convolution 20*a*.

From the foregoing description it can be seen that the fastener assembly 10 includes a helical insert 20 which is utilized in association with the externally and internally threaded members 12 and 14. Upon the application of a load to the threaded members, the helical insert 20 is resiliently twisted about a helical axis 62 extending through each of the uniform turns in the insert. The insert 20 is provided with a plurality of side surfaces 52, 54, 56, and 58. As a load applied to the externally threaded member increases, the side surface 54 moves out of abutting engagement with the leading flank surface 44 of the external thread convolution 24. Another side surface 58 on the insert 20 moves into abutting engagement with the trailing flank surface 46 of external thread convolution 24. As this occurs, load forces are transmitted between the roots 32 and 48 of the internally and externally threaded members and the helical insert 20 is twisted or torqued about its helical axis. Once the insert 20 has been twisted to a fully deflected position, the insert is effective to transmit axial loads between the trailing flanks 40 and 46 of the internal and external thread convolutions.

Having described specific preferred embodiments of the invention, the following is claimed:

1. An assembly comprising a generally helical internal thread convolution having leading and trailing flank surfaces extending between crest and root portions of said internal thread convolution, a generally helical external thread convolution at least partially disposed within said internal thread convolution and having leading and trailing flank surfaces extending between crest and root portions of said external thread convolution, said external thread convolution having a crest diameter which is less than the crest diameter of said internal thread convolution to provide a space between adjacent crests of said internal and external thread convolutions, a generally helical insert having a plurality of turns disposed between said internal and external thread convolutions and having a generally helical central axis extending through each of said turns, said insert having a generally polygonal cross sectional configuration in a radically extending plane with first and second pairs of side surfaces, said insert being resiliently twistable about said helical central axis from a first condition to a fully deflected condition under the influence of torsion forces applied to said insert by said internal and external thread convolutions, said internal thread convolution having a first flank surface disposed in abutting engagement with a first side surface of said first pair of side surfaces on said insert and a second flank surface spaced apart from said insert when said insert is in said first condition, said first flank surface of said internal thread convolution being spaced apart from said insert and said second flank surface of said internal thread convolution being disposed in abutting engagement with a first side surface of said second pair of side surfaces on said insert when said insert is in said fully deflected condition, said first side surfaces of said first and second pairs of side surfaces at least partially defining an included angle which is less than the included angle between said first and second flank surfaces of said internal thread convolution to provide space between one of said flank surfaces of said internal thread convolution and one of said first side surfaces of said first and second pairs of side surfaces when said insert is in said first condition and when said insert is in said fully deflected condition, said external thread convolution having a first flank surface disposed in abutting engagement with a second side surface of said first pair of side surfaces on said insert and a second flank surface spaced apart from said insert is in said first condition, said first flank surface of said external thread convolution being spaced apart from said insert and said second flank surface of said external thread convolution being disposed in abutting engagement with a second side surface of said second pair of side surfaces on said insert when said insert is in said fully deflected condition, said second side surfaces of said first and second pairs of side surfaces at least partially defining an included angle which is less than the included angle between said first and second flank surface of said external thread convolution to provide space between one of said flank surfaces of said external thread convolution and one of said second side surfaces of said first and second pairs of side surfaces when said insert is in said first condition and when said insert is in said fully deflected condition, said helical central axis of said insert being shiftable relative to said internal and external thread convolutions upon twising of said insert from the first condition to the fully deflected condition, said helical central axis of said insert being spaced further from said first flank surfaces of said internal and external thread convolutions when said insert is in said fully deflected condition than when said insert is in said first condition, said helical central axis of said insert being spaced further from said second flank surfaces of said internal and external thread convolutions when said insert is in said initial condition than when said insert is in said fully deflected condition.

2. An assembly as set forth in claim 1 wherein said external thread convolution has a first number of turns per unit of axial length which is different than the number of turns of said internal thread convolution per unit of axial length, said internal and external convolutions being effective to twist said insert to obtain a locking action.

3. An assembly as set forth in claim 1 wherein the included angle between said first side surfaces of said first and second pairs of side surfaces is of a first magnitude and included angle between said second side surfaces of said first and second pairs of side surfaces is of a second magnitude which is different than said first magnitude.

4. An assembly as set forth in claim 1 wherein said first and second side surfaces of said first pair of side surfaces extend parallel to each other and said first and second side surfaces of said second pair of side surfaces extend parallel to each other.

5. An assembly as set forth in claim 1 wherein said first flank surface of one of said thread convolutions extends at a first angle to a radial plane extending perpendicular to the central axis of said one thread convolution and said second flank surface of said one of said thread convolutions extends at a second angle to the radial plane, said first angle having a magnitude which is different than the magnitude of said second angle.

6. An assembly as set forth in claim 1 wherein the included angle between said first side surfaces of said first and second pairs of side surfaces is of the same magnitude as the included angle between said second side surfaces of said first and second pairs of side surfaces.

7. An assembly comprising a generally helical internal thread convolution, a generally helical external thread convolution at last partially disposed within said internal thread convolution, a generally helical insert having a plurality of uniform turns disposed between said internal and external thread convolutions and having a generally helical axis extending through each of said turns, said insert being resiliently twistable about said helical axis from a first condition to a fully deflected condition under the influence of torsion forces applied to said insert by said internal and external thread convolutions, said external thread convolution having a number of turns per unit of axial length which is different than the number of turns of said internal thread convolution per unit of axial length, said internal and external thread convolutions being effective to twist said insert to obtain a locking action.

* * * * *

UNITED STATES PATENT AND TRADEMARK OFFICE
CERTIFICATE OF CORRECTION

PATENT NO. : 4,040,326
DATED : August 9, 1977
INVENTOR(S) : Arthur R. Breed

It is certified that error appears in the above–identified patent and that said Letters Patent are hereby corrected as shown below:

Column 8, line 61, after "insert" add --when said insert--.
Column 9, line 34, after "and" insert --the--.

Signed and Sealed this

Thirteenth Day of December 1977

[SEAL]

Attest:

RUTH C. MASON
Attesting Officer

LUTRELLE F. PARKER
Acting Commissioner of Patents and Trademarks